United States Patent
Miao

(10) Patent No.: US 9,379,630 B2
(45) Date of Patent: Jun. 28, 2016

(54) CONTROL CIRCUIT FOR A SYNCHRONOUS RECTIFICATION CIRCUIT, LLC RESONANT CONVERTER AND ASSOCIATED METHOD

(71) Applicant: Chengdu Monolithic Power Systems Co., Ltd., Chengdu (CN)

(72) Inventor: Lei Miao, Hangzhou (CN)

(73) Assignee: Chengdu Monolithic Power Systems Co., Ltd., Chengdu (CN)

(*) Notice: Subject to any disclaimer, the term of this patent is extended or adjusted under 35 U.S.C. 154(b) by 59 days.

(21) Appl. No.: 14/313,369

(22) Filed: Jun. 24, 2014

(65) Prior Publication Data

US 2014/0376272 A1   Dec. 25, 2014

(30) Foreign Application Priority Data

Jun. 24, 2013  (CN) .......................... 2013 1 0252650

(51) Int. Cl.
*H02M 3/335* (2006.01)
*H02M 7/217* (2006.01)
*H02M 1/00* (2006.01)

(52) U.S. Cl.
CPC .......... *H02M 3/33592* (2013.01); *H02M 7/217* (2013.01); *H02M 2001/0058* (2013.01); *Y02B 70/1433* (2013.01); *Y02B 70/1441* (2013.01); *Y02B 70/1475* (2013.01); *Y02B 70/1491* (2013.01)

(58) Field of Classification Search
CPC ............ H02M 3/33592; H02M 7/217; H02M 2001/0058; Y02B 70/1441; Y02B 70/1475; Y02B 70/1433; Y02B 70/1491
USPC .......................... 363/21.02, 21.06, 21.14, 89
See application file for complete search history.

(56) References Cited

U.S. PATENT DOCUMENTS

| | | | | |
|---|---|---|---|---|
| 2008/0055942 | A1* | 3/2008 | Tao .................... | H02M 3/33592 363/21.03 |
| 2011/0063877 | A1* | 3/2011 | Yang .................. | H02M 3/33592 363/21.06 |
| 2013/0127354 | A1* | 5/2013 | Chiang .................... | H02M 7/06 315/193 |
| 2014/0192575 | A1* | 7/2014 | Olivik ............... | H02M 3/33592 363/89 |

\* cited by examiner

*Primary Examiner* — Adolf Berhane
*Assistant Examiner* — Alex Torres-Rivera
(74) *Attorney, Agent, or Firm* — Perkins Coie LLP

(57) ABSTRACT

A control circuit for a synchronous rectification circuit, a LLC resonant converter and a control method. The control circuit has a first comparing circuit, a second comparing circuit, a blanking circuit, a first logic circuit and a second logic circuit. The blanking circuit is configured to provide a first blanking signal and a second blanking signal to avoid one or more repeated conduction of a first synchronous rectifier and a second synchronous rectifier respectively, and the first blanking signal and the second blanking signal are logic complementary.

16 Claims, 7 Drawing Sheets

US 9,379,630 B2

CONTROL CIRCUIT FOR A SYNCHRONOUS RECTIFICATION CIRCUIT, LLC RESONANT CONVERTER AND ASSOCIATED METHOD

CROSS-REFERENCE TO RELATED APPLICATION(S)

This application claims the benefit of CN application No. 201310252650.0 filed on Jun. 24, 2013 and incorporated herein by reference.

TECHNICAL FIELD

The present invention generally relates to electronic circuit, and more particularly but not exclusively relates to a control circuit for a synchronous rectification circuit and associated control method.

BACKGROUND

In a low-voltage and high-current condition, a synchronous rectifier instead of an ordinary diode may be employed to reduce the power loss of a circuit. However, a synchronous rectifier may often be disturbed by parasitic parameters or noises during an operation resulting in undesirable repeated conduction and blocking switching in one operating cycle. For example, in an LLC resonant converter with a transformer having a dual-channel secondary side, wherein each channel includes a synchronous rectifier, the LLC resonant converter may generate ringing once one of the two synchronous rectifiers is disturbed by parasitic parameters or noises. In this circumstance, a normal on and off switching of the synchronous rectifiers in the dual-channel of the secondary side will be interrupted. Furthermore, the two synchronous rectifiers may have undesirable repeated conduction and blocking switching in one operating cycle, even causing the two synchronous rectifiers both turned on.

Accordingly, a control circuit for a synchronous rectification circuit and associated control method are desired.

SUMMARY

In one embodiment, the present invention discloses a control circuit for a synchronous rectification circuit. The synchronous rectification circuit has a first synchronous rectifier and a second synchronous rectifier, and wherein each of the first synchronous rectifier and the second synchronous rectifier has a drain, a source and a gate. The control circuit comprises: a first comparing circuit having an input terminal and an output terminal, wherein the input terminal of the first comparing circuit is configured to receive a first drain-source voltage signal of the first synchronous rectifier, and wherein the first comparing circuit is configured to compare the first drain-source voltage signal with a threshold voltage and to provide a first comparing signal at the output terminal; a second comparing circuit having an input terminal and an output terminal, wherein the input terminal of the second comparing circuit is configured to receive a second drain-source voltage signal of the second rectifier, and wherein the second comparing circuit is configured to compare the second drain-source voltage signal with the threshold voltage and to provide a second comparing signal at the output terminal; a blanking circuit having a first input terminal, a second input terminal, a first output terminal and a second output terminal, wherein the first input terminal of the blanking circuit is coupled to the output terminal of the first comparing circuit for receiving the first comparing signal, and wherein the second input terminal of the blanking circuit is coupled to the output terminal of the second comparing circuit for receiving the second comparing signal, and wherein the blanking circuit is configured to conduct a logic operation to the first comparing signal and the second comparing signal so as to provide a first blanking signal and a second blanking signal respectively at the first output terminal and the second output terminal, and wherein the first blanking signal and the second blanking signal are logic complementary; a first logic circuit having a first input terminal, a second input terminal, and an output terminal, wherein the first input terminal of the first logic circuit is coupled to the output terminal of the first comparing circuit for receiving the first comparing signal, and wherein the second input terminal of the first logic circuit is coupled to the first output terminal of the blanking circuit for receiving the first blanking signal, and wherein the first logic circuit is configured to conduct a logic operation to the first comparing signal and the first blanking signal so as to provide a first driving signal at the output terminal of the first logic circuit, and wherein the first driving signal is coupled to the gate of the first synchronous rectifier to control an on and off switching of the first synchronous rectifier; and a second logic circuit having a first input terminal, a second input terminal, and an output terminal, wherein the first input terminal of the second logic circuit is coupled to the output terminal of the second comparing circuit for receiving the second comparing signal, and wherein the second input terminal of the second logic circuit is coupled to the second output terminal of the blanking circuit for receiving the second blanking signal, and wherein the second logic circuit is configured to conduct a logic operation to the second comparing signal and the second blanking signal so as to provide a second driving signal at the output terminal of the second logic circuit, and wherein the second driving signal is coupled to the gate of the second synchronous rectifier to control an on and off switching of the second synchronous rectifier.

In one embodiment, the present invention further discloses a control method of a synchronous rectification circuit. The synchronous rectification circuit has a first synchronous rectifier and a second synchronous rectifier, wherein each of the first synchronous rectifier and the second synchronous rectifier has a drain, a source and a gate, and wherein the control method comprises: sensing a voltage between the drain and the source of the first synchronous rectifier to generate a first drain-source voltage signal and a voltage between the drain and the source of the second synchronous rectifier to generate a second drain-source voltage signal; comparing the first drain-source voltage signal with a threshold voltage to generate a first comparing signal; comparing the second drain-source voltage signal with the threshold voltage to generate a second comparing signal; generating a first blanking signal and a second blanking signal based on the first comparing signal and the second comparing signal, wherein the first blanking signal and the second blanking signal are logic complementary; operating the first blanking signal and the first comparing signal to generate a first driving signal, wherein the first driving signal is coupled to the gate of the first synchronous rectifier to control an on and off switching of the first synchronous rectifier; and operating the second blanking signal and the second comparing signal to generate a second driving signal, wherein the second driving signal is coupled to the gate of the second synchronous rectifier to control an on and off switching of the second synchronous rectifier.

In one embodiment, the present invention further discloses a control method of a synchronous rectification circuit. The synchronous rectification circuit has a first synchronous rectifier and a second synchronous rectifier, wherein each of the first synchronous rectifier and the second synchronous rectifier has a drain, a source and a gate, and wherein the control method comprises: sensing a voltage between the drain and the source of the first synchronous rectifier to generate a first drain-source voltage signal, and a voltage between the drain and the source of the second synchronous rectifier to generate a second drain-source voltage signal; comparing the first drain-source voltage signal with a first threshold voltage and determining whether the first drain-source voltage signal is larger than the first threshold voltage, wherein the first drain-source voltage signal and the first threshold voltage are negative; comparing the second drain-source voltage signal with the first threshold voltage and determining whether the second drain-source voltage signal is larger than the first threshold voltage, wherein the second drain-source voltage signal is negative; turning off the first synchronous rectifier if the first drain-source voltage signal is larger than the first threshold voltage; turning off the second synchronous rectifier if the second drain-source voltage signal is larger than the first threshold voltage; generating a first blanking signal and a second blanking signal, if the first drain-source voltage signal is larger than the first threshold voltage, making the first blanking signal is active and the second blanking signal is inactive, if the second drain-source voltage signal is larger than the first threshold voltage, making the first blanking signal is inactive and the second blanking signal is active; comparing the first drain-source voltage signal with a second threshold voltage and determining whether the first drain-source voltage signal is smaller than the second threshold voltage, wherein the second threshold voltage is smaller than the first threshold voltage; comparing the second drain-source voltage signal with the second threshold voltage and determining whether the second drain-source voltage signal is smaller than the second threshold voltage; turning on the first synchronous rectifier if the first drain-source voltage signal is smaller than the second threshold voltage and the first blanking signal is inactive and the second blanking signal is active; and turning on the second synchronous rectifier if the second drain-source voltage signal is smaller than the second threshold voltage and the first blanking signal is active and the second blanking signal is inactive.

BRIEF DESCRIPTION OF THE DRAWINGS

Non-limiting and non-exhaustive embodiments are described with reference to the following drawings. The drawings are only for illustration purpose. Usually, the drawings only show part of the system or circuit of the embodiment, and the same reference label in different drawings have the same, similar or corresponding features or functions.

DETAILED DESCRIPTION

The embodiments of the present invention are described in next. While the invention will be described in conjunction with various embodiments, it will be understood that they are not intended to limit the invention to these embodiments. On contrary, the invention is intended to cover alternatives, modifications and equivalents, which may be included within the spirit and scope of the invention as defined by the appended claims. Furthermore, in the following detailed description of the embodiments of the present invention, numerous specific details are set forth in order to provide a thorough understanding of the embodiments of the present invention. However, it will be obvious to one of ordinary skill in the art that without these specific details the embodiments of the present invention may be practiced. In other instance, well-know circuits, materials, and methods have not been described in detail so as not to unnecessarily obscure aspect of the embodiments of the present invention.

Figure 1A:
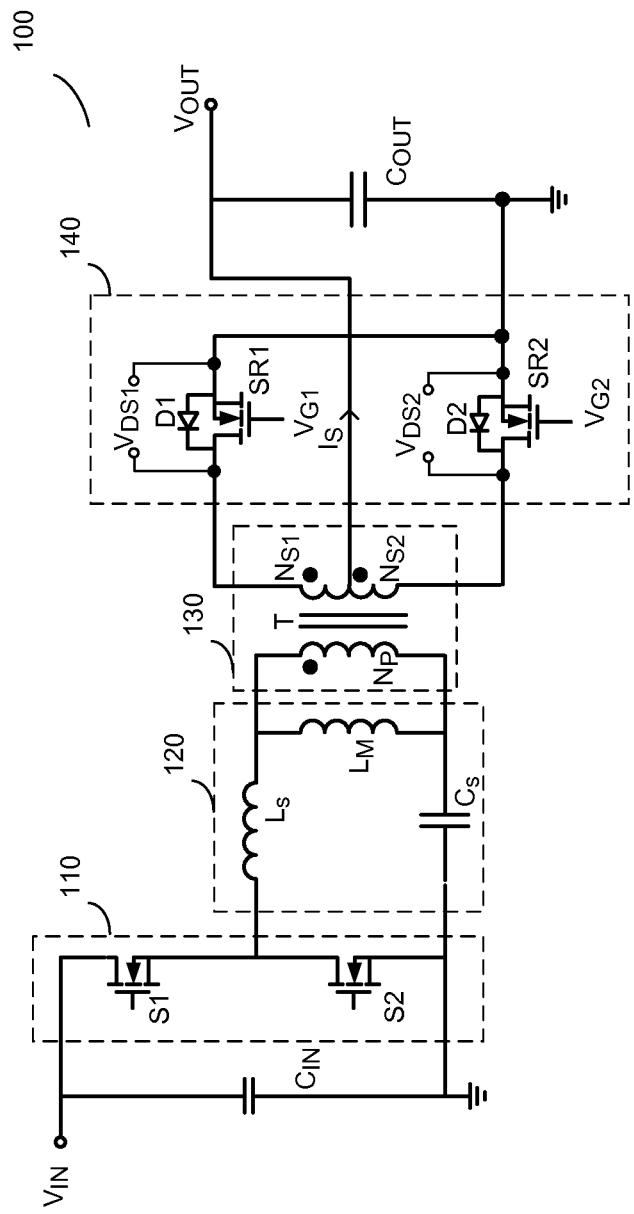
FIG. 1A schematically illustrates a LLC resonant converter according to an embodiment of the present invention.

FIG. 1A schematically illustrates a LLC resonant converter 100 with two synchronous rectifiers according to an embodiment of the present invention. As shown in FIG. 1, the LLC resonant converter 100 may comprise an input capacitor $C_{IN}$, a bridge circuit 110, a LLC resonant circuit 120, a transformer 130, a rectifier circuit 140, a control circuit 150 and an output capacitor $C_{OUT}$.

The capacitor $C_{IN}$ is coupled between an input terminal of the LLC resonant converter 100 and a logic ground GND to receive an input voltage signal $V_{IN}$.

The bridge circuit 110 is coupled between an input terminal of the LLC resonant converter 100 and a reference ground. In one embodiment, the bridge circuit 110 may comprise a half-bridge circuit including a first power transistor S1 and a second power transistor S2, wherein the first power transistor S1 and the second power transistor S2 are conducted alternatively with a 50% duty cycle, i.e. the first power transistor S1 turns on in a half cycle while the second power transistor S2 turns off, and vice versa. In another embodiment, the bridge circuit 110 may comprise a full-bridge circuit.

The LLC resonant circuit 120 is coupled between the bridge circuit 110 and the transformer 130. In one embodiment, the LLC resonant circuit 120 may comprise an inductor $L_S$, a capacitor $C_S$ and a magnetizing inductor $L_M$ of the transformer 130.

The transformer 130 has a primary winding $N_P$ coupled to the LLC resonant circuit 120 and has a first secondary winding $N_{S1}$ and a second secondary winding $N_{S2}$.

The rectifier circuit 140 may comprise a first synchronous rectifier SR1 and a second synchronous rectifier SR2 having a source, a drain and a gate respectively. The source of the first synchronous rectifier SR1 and the source of the second synchronous rectifier SR2 are connected together to the logic ground GND. The drain of the first synchronous rectifier SR1 is coupled to an output terminal of the LLC resonant converter 100 through the first secondary winding $N_{S1}$. The drain of the second synchronous rectifier SR2 is coupled to an output terminal of the LLC resonant converter 100 through the second secondary winding $N_{S2}$. The gate of the first synchronous rectifier SR1 may receive a driving voltage signal $V_{G1}$. The gate of the second synchronous rectifier SR2 may receive a driving voltage signal $V_{G2}$.

The control circuit 150 is configured to control the first synchronous rectifier SR1 and the second synchronous rectifier SR2 to turn on or off. In one embodiment according to the present invention, the control circuit 150 is configured to control the first synchronous rectifier SR1 and the second synchronous rectifier SR2 to avoid a repeated and/or simultaneous conduction.

Figure 1B:
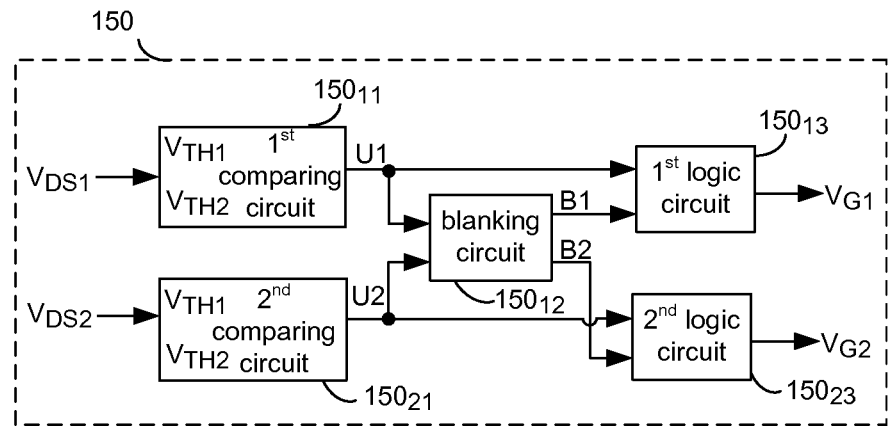
FIG. 1B illustrates a block diagram of a control circuit for controlling a synchronous rectification circuit in FIG. 1A according to an embodiment of the present invention.

FIG. 1B illustrates a block diagram of a control circuit 150 of a synchronous rectification circuit in FIG. 1A according to an embodiment of the present invention. The control circuit 150 is configured to control the first synchronous rectifier SR1 and the second synchronous rectifier SR2 to turn on or off. The control circuit 150 may comprise a first comparing circuit $150_{11}$, a second comparing circuit $150_{21}$, a blanking circuit $150_{12}$, a first logic circuit $150_{13}$ and a second logic circuit $105_{23}$.

The first comparing circuit $150_{11}$ has an input terminal and an output terminal. The input terminal of the first comparing circuit $150_{11}$ is configured to receive a first drain-source voltage signal $V_{DS1}$ representing a voltage between the drain and the source of the first synchronous rectifier SR1. The first comparing circuit $150_{11}$ is configured to compare the first drain-source voltage signal $V_{DS1}$ with a first threshold voltage $V_{TH1}$ and a second threshold voltage $V_{TH2}$ respectively. The output terminal of the first comparing circuit $150_{11}$ is configured to provide a first comparing signal U1. The first threshold voltage $V_{TH1}$ may be a threshold voltage for turning off a synchronous rectifier (e.g. SR1 and SR2). The second threshold voltage $V_{TH2}$ may be a threshold voltage for turning on a synchronous rectifier (e.g. SR1 and SR2). Wherein the absolute value of the first threshold voltage $V_{TH1}$ is smaller than the absolute value of the second threshold voltage $V_{TH2}$.

In one embodiment, the first comparing signal U1 is logic high once the first drain-source voltage signal $V_{DS1}$ is smaller than the second threshold voltage $V_{TH2}$, wherein $V_{DS1} < V_{TH2} < 0$, and the first comparing signal U1 is logic low once the first drain-source voltage signal $V_{DS1}$ is larger than the first threshold voltage $V_{TH1}$, wherein $0 > V_{DS1} > V_{TH1}$. In another embodiment, the first comparing signal U1 is logic high once the first drain-source voltage signal $V_{DS1}$ is larger than the second threshold voltage $V_{TH2}$, wherein $V_{DS1} > V_{TH2} > 0$, and the first comparing signal U1 is logic low once the first drain-source voltage signal $V_{DS1}$ is smaller than the first threshold voltage $V_{TH1}$, wherein $0 < V_{DS1} < V_{TH1}$.

The second comparing circuit $150_{21}$ has an input terminal and an output terminal. The input terminal of the second comparing circuit $150_{21}$ is configured to received a second drain-source voltage signal $V_{DS2}$ representing a voltage between the drain and the source of the second synchronous rectifier SR2. The second comparing circuit $150_{21}$ is configured to compare the second drain-source voltage signal $V_{DS2}$ with the first threshold voltage $V_{TH1}$ and the second threshold voltage $V_{TH2}$ respectively. The output terminal of the second comparing circuit $150_{21}$ is configured to provide a second comparing signal U2.

In one embodiment, the second comparing signal U2 is logic high once the second drain-source voltage signal $V_{DS2}$ is smaller than the second threshold voltage $V_{TH2}$, wherein $V_{DS2} < V_{TH2} < 0$, and the second comparing signal U2 is logic low once the second drain-source voltage signal $V_{DS2}$ is larger than the first threshold voltage $V_{TH1}$, wherein $0 > V_{DS2} > V_{TH1}$. In another embodiment, the second comparing signal U2 is logic high once the second drain-source voltage signal $V_{DS2}$ is larger than the second threshold voltage $V_{TH2}$, wherein $V_{DS2} > V_{TH2} > 0$, and the second comparing signal U2 is logic low once the second drain-source voltage signal $V_{DS2}$ is smaller than the first threshold voltage $V_{TH1}$, wherein $0 < V_{DS2} < V_{TH1}$.

The blanking circuit $150_{12}$ has a first input terminal, a second input terminal, a first output terminal and a second output terminal. The first input terminal of the blanking circuit $150_{12}$ may be coupled to the output terminal of the first comparing circuit $150_{11}$ for receiving the first comparing signal U1. The second input terminal of the blanking circuit $150_{12}$ may be coupled to the output terminal of the second comparing circuit $150_{21}$ for receiving the second comparing signal U2. The blanking circuit $150_{12}$ is configured to conduct a logic operation to the first comparing signal U1 and the second comparing signal U2, and to provide a first blanking signal B1 and a second blanking signal B2 based on the logic operation, wherein the first blanking signal B1 and the second blanking signal B2 are logic complementary. In an embodiment, the first blanking signal B1 is active beginning at each falling edge of the first comparing signal U1 and ending at each falling edge of the second comparing signal U2. In one embodiment, the first blanking signal B1 is active means that the first blanking signal B1 is logic high, i.e., the first blanking signal B1 is changed from logic low to logic high at each falling edge of the first comparing signal U1 and from logic high to logic low at each falling edge of the second comparing signal U2. In another embodiment, the first blanking signal B1 is active means that the first blanking signal B1 is logic low, i.e., the first blanking signal B1 is changed from logic high to logic low at each falling edge of the first comparing signal U1 and from logic low to logic high at each falling edge of the second comparing signal U2. The first synchronous rectifier SR1 remains off when the first blanking signal is active. The second blanking signal B2 is active beginning at each falling edge of the second comparing signal U2 and ending at each falling edge of the first comparing signal U1. In one embodiment, the second blanking signal B2 is active means that the second blanking signal B2 is logic high, i.e., the second blanking signal B2 is changed from logic low to logic high at each falling edge of the second comparing signal U2 and from logic high to logic low at each falling edge of the first comparing signal U1. In another embodiment, the second blanking signal B2 is active means that the second blanking signal B2 is logic low, i.e., the second blanking signal B2 is changed from logic high to logic low at each falling edge of the second comparing signal U2 and from logic low to logic high at each falling edge of the first comparing signal U1. The second synchronous rectifier SR2 remains off when the second blanking signal is active.

The first logic circuit $150_{13}$ has a first input terminal, a second input terminal, and an output terminal. The first input terminal of the first logic circuit $150_{13}$ is coupled to the first comparing circuit $150_{11}$ for receiving the first comparing signal U1. The second input terminal of the first logic circuit $150_{13}$ is coupled to the blanking circuit $150_{12}$ for receiving the first blanking signal B1. The first logic circuit $150_{13}$ is configured to conduct a logic operation to the first comparing signal U1 and the first blanking signal B1, and to provide a first driving signal $V_{G1}$ at the output terminal of the first logic circuit $150_{13}$. The first driving signal $V_{G1}$ may be transmitted to the first synchronous rectifier SR1 to control the on and off switching of the first synchronous rectifier SR1 at the output.

In one embodiment, when the first blanking signal B1 is inactive, the first synchronous rectifier SR1 is turned off once the first drain-source voltage signal $V_{DS1}$ is larger than the first threshold voltage $V_{TH1}$, wherein $0 > V_{DS1} > V_{TH1}$. When the first blanking signal B1 is inactive, the first synchronous rectifier SR1 is turned on once the first drain-source voltage signal $V_{DS1}$ is smaller than the second threshold voltage $V_{TH2}$, wherein $V_{DS1}<V_{TH2}<0$. In another embodiment, when the first blanking signal B1 is inactive, the first synchronous rectifier SR1 is turned off once the first drain-source voltage signal $V_{DS1}$ is smaller than the first threshold voltage $V_{TH1}$, wherein $0<V_{DS1}<V_{TH1}$. When the first blanking signal B1 is inactive, the first synchronous rectifier SR1 is turned on once the first drain-source voltage signal $V_{DS1}$ is larger than the second threshold voltage $V_{TH2}$, wherein $V_{DS1}>V_{TH2}>0$.

The second logic circuit $150_{23}$ has a first input terminal, a second input terminal, and an output terminal. The first input terminal of the second logic circuit $150_{23}$ is coupled to the second comparing circuit $150_{21}$ for receiving the second comparing signal U2. The second input terminal of the second logic circuit $150_{23}$ is coupled to the blanking circuit $150_{12}$ for receiving the second blanking signal B2. The second logic circuit $150_{23}$ is configured to conduct a logic operation to the second comparing signal U2 and the second blanking signal B2, and to provide a second driving signal $V_{G2}$ at the output terminal of the first logic circuit $150_{23}$. The second driving signal $V_{G2}$ may be transmitted to the second synchronous rectifier SR2 to control the on and off switching of the second synchronous rectifier SR2.

In one embodiment, when the second blanking signal B2 is inactive, the second synchronous rectifier SR2 is turned off once the second drain-source voltage signal $V_{DS2}$ is larger than the first threshold voltage $V_{TH1}$, wherein $0>V_{DS2}>V_{TH1}$. When the second blanking signal B2 is inactive, the second synchronous rectifier SR2 is turned on once the second drain-source voltage signal $V_{DS2}$ is smaller than the second threshold voltage $V_{TH2}$, wherein $V_{DS2}<V_{TH2}<0$. In another embodiment, when the second blanking signal B2 is inactive, the second synchronous rectifier SR2 is turned off once the second drain-source voltage signal $V_{DS2}$ is smaller than the first threshold voltage $V_{TH1}$, wherein $0<V_{DS2}<V_{TH1}$. When the second blanking signal B2 is inactive, the second synchronous rectifier SR2 is turned on once the second drain-source voltage signal $V_{DS2}$ is larger than the second threshold voltage $V_{TH2}$, wherein $V_{DS2}>V_{TH2}>0$.

Figure 1C:
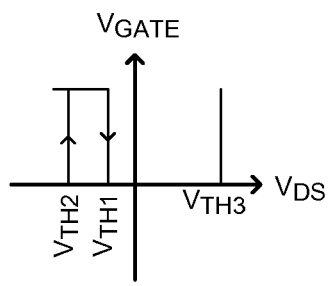
FIG. 1C illustrates a plot of a drain-source voltage of a synchronous rectifier in FIG. 1A according to an embodiment of the present invention.

FIG. 1C illustrates a plot of a drain-source voltage changing of a synchronous rectifier in FIG. 1A according to an embodiment of the present invention. In the embodiment shown in FIG. 1C, the value of a drain-source voltage signal $V_{DS}$ of a synchronous rectifier (e.g., SR1 and/or SR2) is a negative value, thus, $V_{TH2}<V_{TH1}<0$. $V_{GATE}$ is a driving voltage signal of a synchronous rectifier, e.g., $V_{G1}$ and/or $V_{G2}$.

Figure 2:
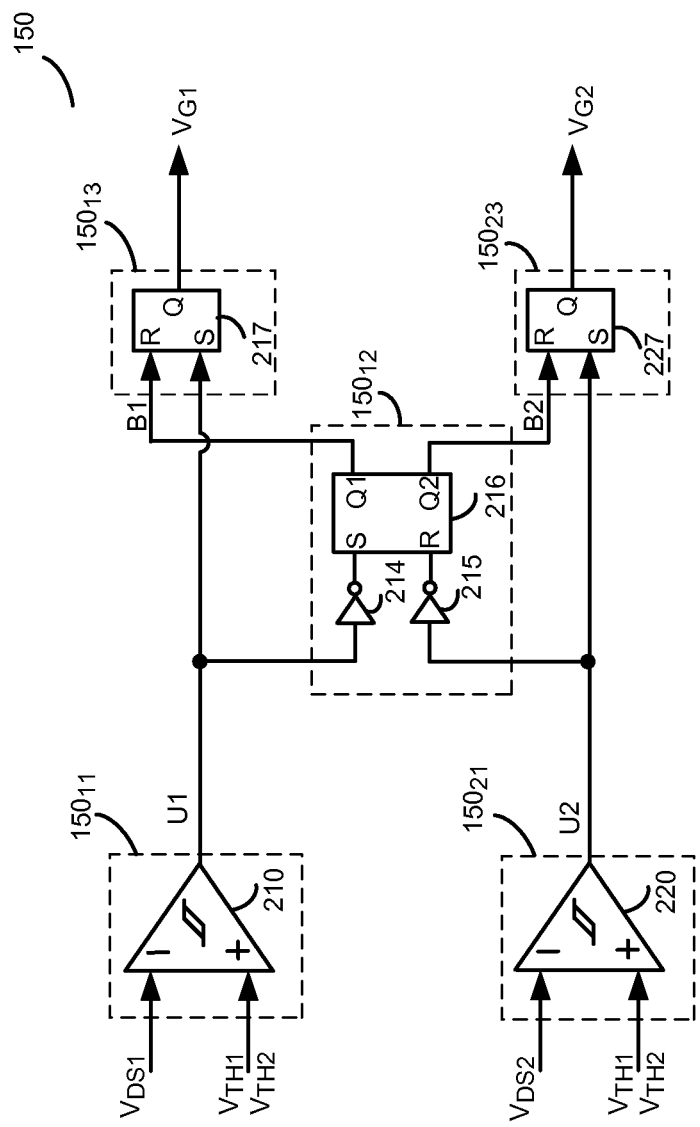
FIG. 2 schematically illustrates the control circuit for a LLC resonant converter shown as FIG. 1B according to an embodiment of the present invention.

FIG. 2 schematically illustrates a control circuit 150 of a synchronous rectification circuit according to an embodiment of the present invention.

The first comparing circuit $150_{11}$ may comprise a first hysteresis comparator 210. The first hysteresis comparator 210 has an inverting input terminal, a non-inverting input terminal and an output terminal. The non-inverting input terminal of the first hysteresis comparator 210 is configured to receive the first threshold voltage $V_{TH1}$ and the second threshold voltage $V_{TH2}$. The inverting input terminal of the first hysteresis comparator 210 is configured to receive the first drain-source voltage signal $V_{DS1}$. The first hysteresis comparator 210 is configured to compare the first threshold voltage $V_{TH1}$ with the first drain-source voltage signal $V_{DS1}$, and to compare the second threshold voltage $V_{TH2}$ with the first drain-source voltage signal $V_{DS1}$, and to provide the first comparing signal U1 at the output terminal.

In one embodiment, the first comparing signal U1 is logic high once the first drain-source voltage signal $V_{DS1}$ is smaller than the second threshold voltage $V_{TH2}$, wherein $V_{DS1}<V_{TH2}<0$, and the first comparing signal U1 is logic low once the first drain-source voltage signal $V_{DS1}$ is larger than the first threshold voltage $V_{TH1}$, wherein $0>V_{DS1}>V_{TH1}$. In another embodiment, the first comparing signal U1 is logic high once the first drain-source voltage signal $V_{DS1}$ is larger than the second threshold voltage $V_{TH2}$, wherein $V_{DS1}>V_{TH2}>0$, and the first comparing signal U1 is logic low once the first drain-source voltage signal $V_{DS1}$ is smaller than the first threshold voltage $V_{TH1}$, wherein $0<V_{DS1}<V^{TH1}$.

The second comparing circuit $150_{21}$ may comprise a second hysteresis comparator 220. The second hysteresis comparator 220 has an inverting input terminal, a non-inverting input terminal and an output terminal. The non-inverting input terminal of the second hysteresis comparator 220 is configured to receive the first threshold voltage $V_{TH1}$ and the second threshold voltage $V_{TH2}$. The inverting input terminal of the second hysteresis comparator 220 is configured to receive the second drain-source voltage signal $V_{DS2}$. The second hysteresis comparator 220 is configured to compare the first threshold voltage $V_{TH1}$ with the second drain-source voltage signal $V_{DS2}$, and to compare the second threshold voltage $V_{TH2}$ with the second drain-source voltage signal $V_{DS2}$, and to provide the second comparing signal U2 at the output terminal.

In one embodiment, the second comparing signal U2 is logic high once the second drain-source voltage signal $V_{DS2}$ is smaller than the second threshold voltage $V_{TH2}$, wherein $V_{DS2}<V_{TH2}<0$, and the second comparing signal U2 is logic low once the second drain-source voltage signal $V_{DS2}$ is larger than the first threshold voltage $V_{TH1}$, wherein $0>V_{DS2}>V_{TH1}$. In another embodiment, the second comparing signal U2 is logic high once the second drain-source voltage signal $V_{DS2}$ is larger than the second threshold voltage $V_{TH2}$, wherein $V_{DS2}>V_{TH2}>0$, and the second comparing signal U2 is logic low once the second drain-source voltage signal $V_{DS2}$ is smaller than the first threshold voltage $V_{TH1}$, wherein $0<V_{DS2}<V^{TH1}$.

The blanking circuit $150_{12}$ may comprise a first inverter 214, a second inverter 215 and a trigger 216. The first inverter 214 and the second inverter 215 have an input terminal and an output terminal respectively. The input terminal of the first inverter 214 is configured to receive the first comparing signal U1 and the input terminal of the second inverter 215 is configured to receive the second comparing signal U2. The trigger 216 has a first input terminal S, a second input terminal R, a first output terminal Q1 and a second output terminal Q2. The first input terminal S of the trigger 216 is coupled to the output terminal of first inverter 214. The second input terminal R of the trigger 216 is coupled to the output terminal of the second inverter 215. The first output terminal Q1 of the trigger 216 is configured to provide the first blanking signal B1, and the second output terminal Q2 of the trigger 216 is configured to provide the second blanking signal B2, wherein the first blanking signal B1 and the second blanking signal B2 are logic complementary signals.

In one embodiment, the first blanking signal B1 is logic high beginning at each falling edge of the first comparing signal U1 and ending at each falling edge of the second comparing signal U2. The first synchronous rectifier SR1 remains off when the first blanking signal B1 is logic high. The second blanking signal B2 is logic high beginning at each falling edge of the second comparing signal U2 and ending at each falling edge of the first comparing signal U1. The second synchronous rectifier SR2 remains off when the second blanking signal B2 is logic high.

The first logic circuit $150_{13}$ may comprise a trigger 217. The trigger 217 has a first input terminal S, a second input terminal R, an output terminal Q. The first input terminal S of the trigger 217 is coupled to the output terminal of the first hysteresis comparator 210 to receive the first comparing signal U1. The second input terminal R of the trigger 217 is coupled to the first output terminal Q1 of the trigger 216 to receive the first blanking signal B1. The output terminal Q of the trigger 217 is configured to provide the first driving signal $V_{G1}$ to control an on and off switching of the first synchronous rectifier SR1. In one embodiment, the first driving signal $V_{G1}$ is set to logic high when the first comparing signal U1 is logic high and the first blanking B1 is logic low. The first driving signal $V_{G1}$ changes to logic low once the first blanking B1 is logic high.

The second logic circuit $150_{23}$ may comprise a trigger 227. The trigger 227 has a first input terminal S, a second input terminal R, an output terminal Q. The first input terminal S of the trigger 227 is coupled to the output terminal of the second hysteresis comparator 220 to receive the second comparing signal U2. The second input terminal R of the trigger 217 is coupled to the second output terminal Q2 of the trigger 216 to receive the second blanking signal B2. The output terminal Q of the trigger 227 is configured to provide the second driving signal $V_{G2}$ to control an on and off switching of the second synchronous rectifier SR2. In one embodiment, the second driving signal $V_{G2}$ is set to logic high when the second comparing signal U2 is logic high and the second blanking B2 is logic low. The second driving signal $V_{G2}$ changes to logic low once the second blanking B2 is logic high.

Figure 3:
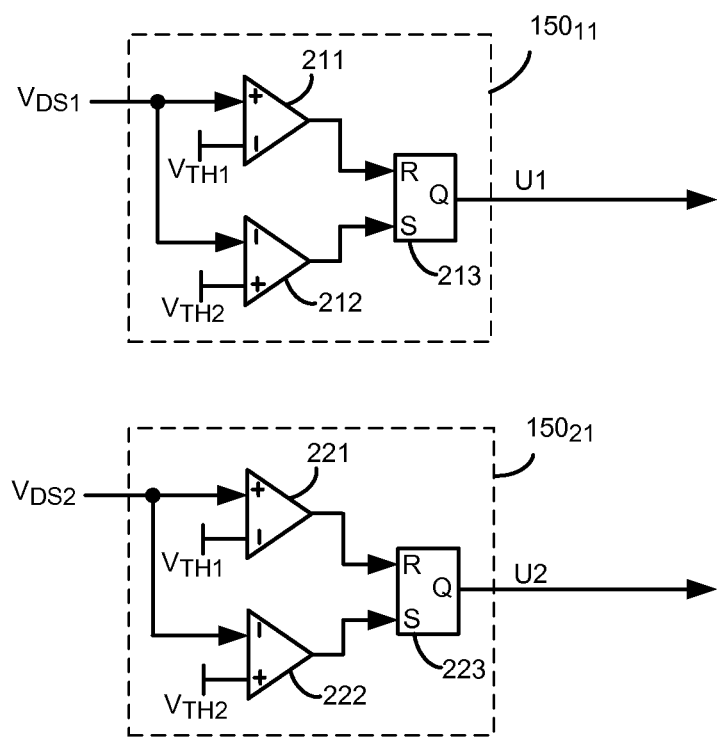
FIG. 3 schematically illustrates a control circuit for controlling a synchronous rectification circuit in a LLC resonant converter according to an alternative embodiment of the present invention.

FIG. 3 schematically illustrates a control circuit 150 of a synchronous rectification circuit according to an alternative embodiment of the present invention. Comparing with FIG. 2, an alternative first comparing circuit $150_{11}$ and an alternative second comparing circuit $150_{21}$ are adopted.

The first comparing circuit $150_{11}$ may comprise a first comparator 211, a second comparator 212 and a first trigger 213.

The first comparator 211 has an inverting input terminal, a non-inverting input terminal and an output terminal. The inverting input terminal of the first comparator 211 is configured to receive the first threshold voltage $V_{TH1}$. The non-inverting input terminal of the first comparator 211 is configured to receive the first drain-source voltage signal $V_{DS1}$. The first comparator 211 is configured to compare the first threshold voltage $V_{TH1}$ with the first drain-source voltage signal $V_{DS1}$, and to provide an output signal at the output terminal.

The second comparator 212 has an inverting input terminal, a non-inverting input terminal and an output terminal. The non-inverting input terminal of the second comparator 212 is configured to receive the second threshold voltage $V_{TH2}$. The inverting input terminal of the second comparator 212 is configured to receive the first drain-source voltage signal $V_{DS1}$. The second comparator 212 is configured to compare the second threshold voltage $V_{TH2}$ with the first drain-source voltage signal $V_{DS1}$, and to provide an output signal at the output terminal.

The first trigger 213 may comprise an RS-type trigger having a first input terminal R, a second input terminal S and an output terminal Q. The first input terminal R of the first trigger 213 is coupled to the output terminal of the first comparator 211. The second input terminal S of the first trigger 213 is coupled to the output terminal of the second comparator 212. The output terminal Q of the first trigger 213 operated as the output terminal of the first comparing circuit $150_{11}$ is configured to provide the first comparing signal U1.

In this embodiment, the value of the first drain-source voltage signal $V_{DS1}$ is a negative value and $V_{TH2}<V_{TH1}<0$. Accordingly, the first comparing signal U1 is logic high once $V_{DS1}<V^{TH2}$, and the first comparing signal U1 is logic low once $V_{DS1}>V_{TH1}$.

The second comparing circuit $150_{21}$ may comprise a third comparator 221, a fourth comparator 222 and a second trigger 223.

The third comparator 221 has an inverting input terminal, a non-inverting input terminal and an output terminal. The inverting input terminal of the third comparator 221 is configured to receive the first threshold voltage $V_{TH1}$. The non-inverting input terminal of the first comparator 211 is configured to receive the second drain-source voltage signal $V_{DS2}$. The third comparator 221 is configured to compare the first threshold voltage $V_{TH1}$ and the second drain-source voltage signal $V_{DS2}$, and to provide an output signal at the output terminal of the third comparator 221.

The fourth comparator 222 has an inverting input terminal, a non-inverting input terminal and an output terminal. The non-inverting input terminal of the fourth comparator 222 is configured to receive the second threshold voltage $V_{TH2}$. The inverting input terminal of the fourth comparator 222 is configured to the second drain-source voltage signal $V_{DS2}$ receive. The fourth comparator 222 is configured to compare the second threshold voltage $V_{TH2}$ with the second drain-source voltage signal $V_{DS2}$, and to provide an output signal at the output terminal.

The second trigger 223 may comprise an RS-type trigger having a first input terminal R, a second input terminal S and an output terminal Q. The first input terminal R of the second trigger 223 is coupled to the output terminal of the third comparator 221. The second input terminal S of the trigger 213 is coupled to the output terminal of the fourth comparator 222. The output terminal Q of the second trigger 223 operated as the output terminal of the second comparing circuit $150_{21}$ is configured to provide the second comparing signal U2.

In this embodiment, the value of the second drain-source voltage signal $V_{DS2}$ is a negative value and $V_{TH2}<V_{TH1}<0$. Accordingly, the second comparing signal U2 is logic high once $V_{DS2}<V_{TH2}$, and the second comparing signal U2 is logic low once $V_{DS2}>V_{TH1}$.

It should be understood, the first comparing circuit $150_{11}$, the second comparing circuit $150_{21}$, the blanking circuit $150_{12}$, the first logic circuit $150_{13}$ and the second logic circuit $150_{23}$ may be illustrative embodiments which is not intended to limit the invention to these embodiment.

Figure 4:
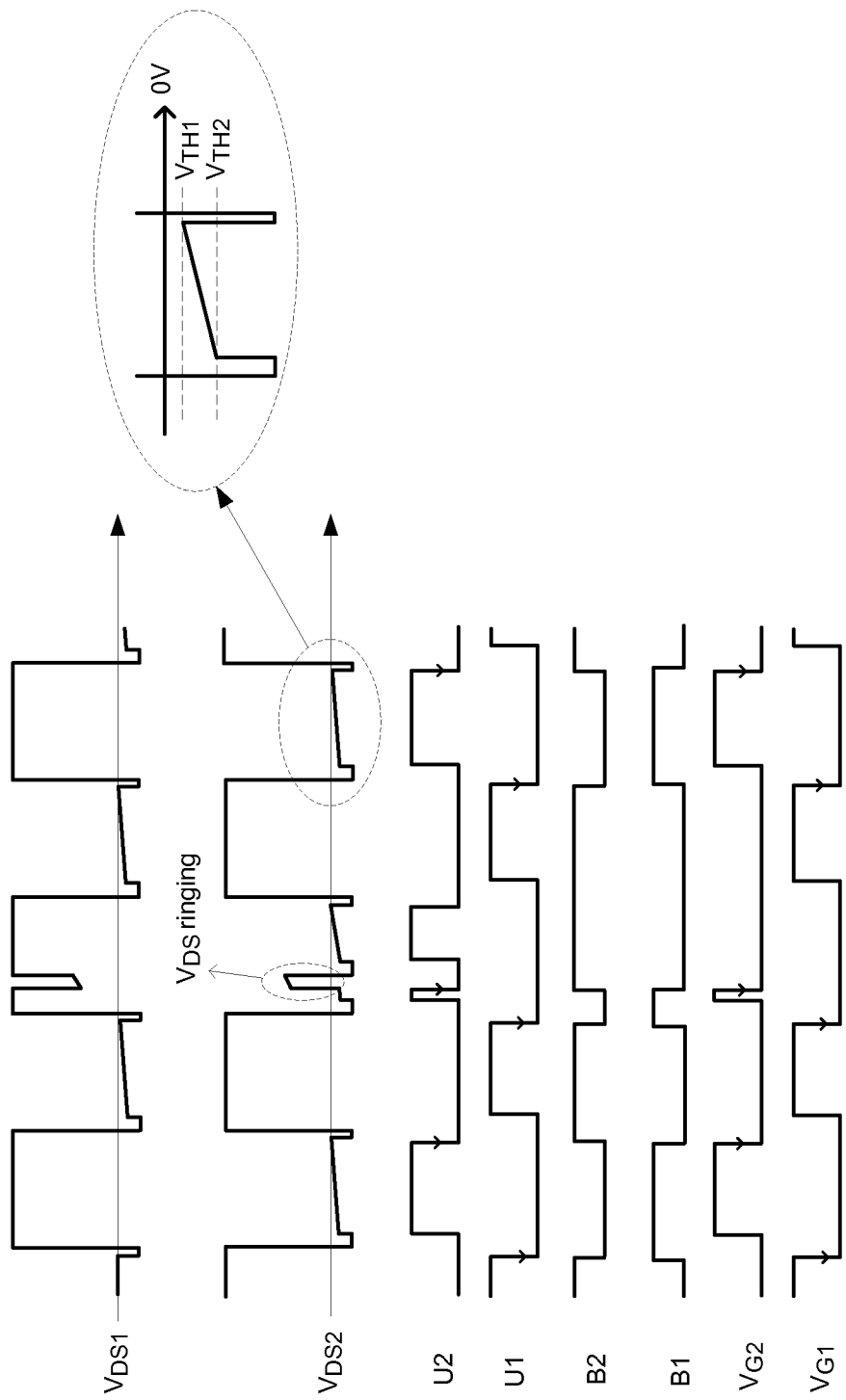
FIG. 4 illustrates a schematic waveform diagram of various signals generated by a LLC resonant converter according to an embodiment of the present invention.

FIG. 4 illustrates a schematic waveform diagram of various signals generated of a LLC resonant converter according to an embodiment of the present invention. In conjunction with FIG. 1, FIG. 2, FIG. 3, the LLC resonant converter operates as follows:

When a positive current flows through the primary winding $N_P$ of the transformer 130, the first synchronous rectifier SR1 remains off until the positive current becomes negative. At the beginning of this period, the second synchronous rectifier SR2 is turned off, and a rectifier current $I_S$ flows through the secondary winding $N_{S2}$ of the transformer 130 and the body diode D2 of the second synchronous rectifier SR2 to form a current loop. At this time, the value of the second drain-source voltage signal $V_{DS2}$ is a voltage drop of the body diode D2. The second synchronous rectifier SR2 is turned on once the value of the second drain-source voltage signal $V_{DS2}$ reaches the second threshold voltage $V_{TH2}$. Accordingly, the rectifier current $I_S$ flows through the secondary winding $N_{S2}$ of the transformer 130 and the second synchronous rectifier SR2 to form a current loop. At this time, the value of the second drain-source voltage signal $V_{DS2}$ is a conduction voltage drop of the second synchronous rectifier SR2.

The absolute value of the second drain-source voltage signal $V_{DS2}$ may decrease with the decreasing of the rectifier current $I_S$. When the value of the second drain-source voltage signal $V_{DS2}$ reaches the first threshold voltage $V_{TH1}$, the second synchronous rectifier SR2 is turned off. The rectifier current $I_S$ freewheels from the body diode D2 of the second drain-source voltage signal $V_{DS2}$ until the positive current becomes negative.

When the positive current becomes negative the second synchronous rectifier SR2 remains off until the negative current becomes positive again. In this circumstance, the first synchronous rectifier SR1 has a similar operation with the second synchronous rectifier SR2.

As shown in the waveform diagrams of FIG. 4, the first blanking signal B1 is set to logic high once a falling edge of the first comparing signal U1 arrives, i.e. the first synchronous rectifier SR1 is turned off. The first blanking signal B1 is set to logic low once a falling edge of the second comparing signal U2 is arrived, i.e. the second synchronous rectifier SR2 is turned off. Likewise, the second blanking signal B2 is set to logic high when a falling edge of the second comparing signal U2 is arrived, i.e. the second synchronous rectifier SR2 is turned off. The second blanking signal B2 is set to logic low when a falling edge of the first comparing signal U1 is arrived, i.e. the first synchronous rectifier SR1 is turned off In one operating cycle, when a positive current flows through the primary winding $N_P$ of the transformer 130, the first synchronous rectifier SR1 remains off until the negative current arrives so that the first drain-source voltage signal $V_{DS1}$ is a positive constant voltage. The body diode D2 of the second synchronous rectifier SR2 is turned on at the beginning so that the value of the second drain-source voltage signal $V_{DS2}$ is a conduction voltage drop of the body diode D2 which is a negative voltage. In the following, the second comparing signal U2 is set logic high once the value of the second drain-source voltage signal $V_{DS2}$ reaches the second threshold voltage $V_{TH2}$, and the second driving signal $V_{G2}$ is set logic low correspondingly so as to turn on the second synchronous rectifier SR2. Accordingly, the value of the second drain-source voltage signal $V_{DS2}$ is a conduction voltage drop of the second synchronous rectifier SR2 which is a negative value.

The absolute value of the second drain-source voltage signal $V_{DS2}$ may decrease with the decreasing of the rectifier current $I_S$. Normally, during an operating cycle, the second synchronous rectifier SR2 remains on after the second drain-source voltage signal $V_{DS2}$ arrives at the first threshold voltage $V_{TH2}$. However, one or more ringings will arise due to the interference of parasitic between the source and drain of a synchronous rectifier. In the embodiment shown in FIG. 4, a ringing appears in the second synchronous rectifier SR2 which can cause an instantaneous high voltage, accordingly, the second drain-source voltage signal $V_{DS2}$ reaches the first threshold voltage $V_{TH1}$ so that the second comparing signal U2 is set to logic low. Consequently, the second synchronous rectifier SR2 is turned off and the second blanking signal B2 is changed from logic low state to logic high state.

After the ringing, the body diode D2 of the second synchronous rectifier SR2 is turned on and the value of the second drain-source voltage signal $V_{DS2}$ is a conduction voltage drop of the body diode D2. If the value of the second drain-source voltage signal $V_{DS2}$ reaches the second threshold voltage $V_{TH2}$, the second comparing signal U2 is changed to logic high again. Fortunately, the second blanking signal B2 is logic high so as to keep the second driving signal $V_{G2}$ logic low, i.e. the second synchronous rectifier SR2 remains off until one operating cycle is over.

Without a blanking circuit $150_{12}$ in such application, the second synchronous rectifier SR2 will be turned on again after the ringing. That is to say, the second synchronous rectifier SR2 will be turned on twice in one operating cycle. If two ringings arise in one operating cycle, triple turning on will happen to the second synchronous rectifier SR2. In this way, the second synchronous rectifier SR2 will be turned on corresponding times when any number ringings arise in one operating cycle. In other embodiment, if ringings arise between the source and the drain of the first synchronous rectifier SR1, the first synchronous rectifier SR1 will be turned on again in one operating cycle similarly.

Figure 5:
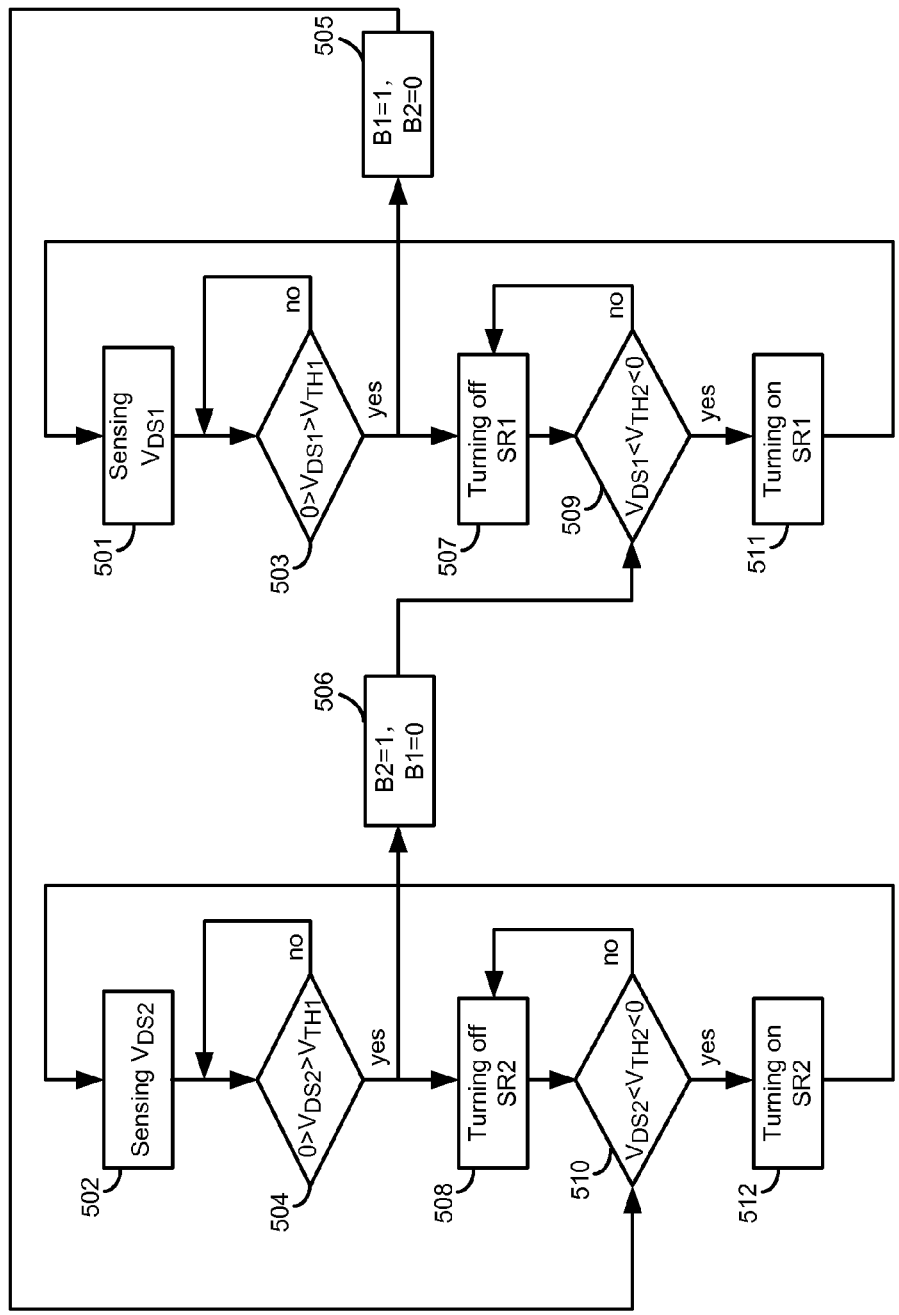
FIG. 5 illustrates a flow diagram illustrating a control method of a LLC resonant converter according to an embodiment of the present invention.

FIG. 5 illustrates a flow diagram illustrating a control method for controlling a LLC resonant converter according to an embodiment of the present invention. The control method may comprise steps 501-512. In this embodiment, the value of the first drain-source voltage signal $V_{DS1}$ and the second drain-source voltage signal $V_{DS2}$ are negative, thus we set $V^{TH2} < V_{TH1} < 0$ correspondingly.

In step 501, the voltage between the drain and the source of the first synchronous rectifier SR1 is sensed by a sensing circuit to generate a first drain-source voltage signal $V_{DS1}$. Then turning to the step 503.

In step 502, the voltage between the drain and the source of the second synchronous rectifier SR2 is sensed by a sensing circuit to generate a second drain-source voltage signal $V_{DS2}$. Then turning to the step 504.

In step 503, the first drain-source voltage signal $V_{DS1}$ is compared with a first threshold voltage $V_{TH1}$. Determining whether the first drain-source voltage signal $V_{DS1}$ is larger than the first threshold voltage $V_{TH1}$. If $0 > V_{DS1} > V_{TH1}$, then turns to the step 505 and the step 507.

In step 504, the second drain-source voltage signal $V_{DS2}$ is compared with a first threshold voltage $V_{TH1}$. Determining whether the second drain-source voltage signal $V_{DS2}$ is larger than the first threshold voltage $V_{TH1}$. If $0 > V_{DS2} > V_{TH1}$, then turns to the step 506 and the step 508.

In step 505, a blanking circuit is configured to provide a first blanking signal B1 and a second blanking signal B2, and further to activate the first blanking signal B1 and inactivate the second blanking signal B2 once $0 > V_{DS1} > V_{TH1}$, then turning to step 510. In one embodiment, active state means the first blanking signal B1 has a logic high state and inactive state means the second blanking signal B2 having a logic low state correspondingly.

In step 506, a blanking circuit is configured to provide a first blanking signal B1 and a second blanking signal B2, and further to inactivate the first blanking signal B1 and activate the second blanking signal B2 once $0 > V_{DS2} > V_{TH1}$, then turning to step 409. In one embodiment, inactive state means the first blanking signal B1 has a logic low state and active state means the second blanking signal B2 having a logic high state correspondingly.

In step 507, the first synchronous rectifier SR1 is turned off, then turning to the step 509.

In step 508, the second synchronous rectifier SR2 is turned off, then turning to the step 510.

In step 509, the first drain-source voltage signal $V_{DS1}$ is compared with a second threshold voltage $V_{TH2}$. Then determining whether the first drain-source voltage signal $V_{DS1}$ is smaller than the second threshold voltage $V_{TH2}$. If $V_{DS1} < V_{TH2} < 0$ and the first blanking signal B1 is inactive and the second blanking signal B2 is active, then turning to the step 511. In one embodiment, the first blanking signal B1 is inactive and the second blanking signal B2 is active means that the first blanking signal B1 is logic low and the second blanking signal B2 is logic high.

In step 510, the second drain-source voltage signal $V_{DS2}$ is compared with a second threshold voltage $V_{TH2}$. Then determining whether the second drain-source voltage signal $V_{DS2}$ is smaller than the second threshold voltage $V_{TH2}$. If $V_{DS2} < V_{TH2} < 0$ and the first blanking signal B1 is active and the second blanking signal B2 is inactive, then turning to the step 512. In one embodiment, the first blanking signal B1 is active and the second blanking signal B2 is inactive means that the first blanking signal B1 is logic high and the second blanking signal B2 is logic low.

In step 511, the first synchronous rectifier SR1 is turned on, then turning to the step 501.

In step 512, the second synchronous rectifier SR2 is turned on, then turning to the step 502.

In the description of the control method of the present invention, the step 502 follows the step 501, the step 504 follows the step 503, the step 506 follows the step 505, the step 508 follows the step 507, the step 510 follows the step 509, and the step 512 follows the step 511. However, It should be known for an ordinary skill in the art that, the step 502 and the step 501 happen simultaneously, the step 504 and the step 503 happen simultaneously, the step 506 and the step 505 happen simultaneously, the step 508 and the step 507 happen simultaneously, the step 510 and the step 509 happen simultaneously, the step 512 and the step 511 happen simultaneously.

Figure 6:
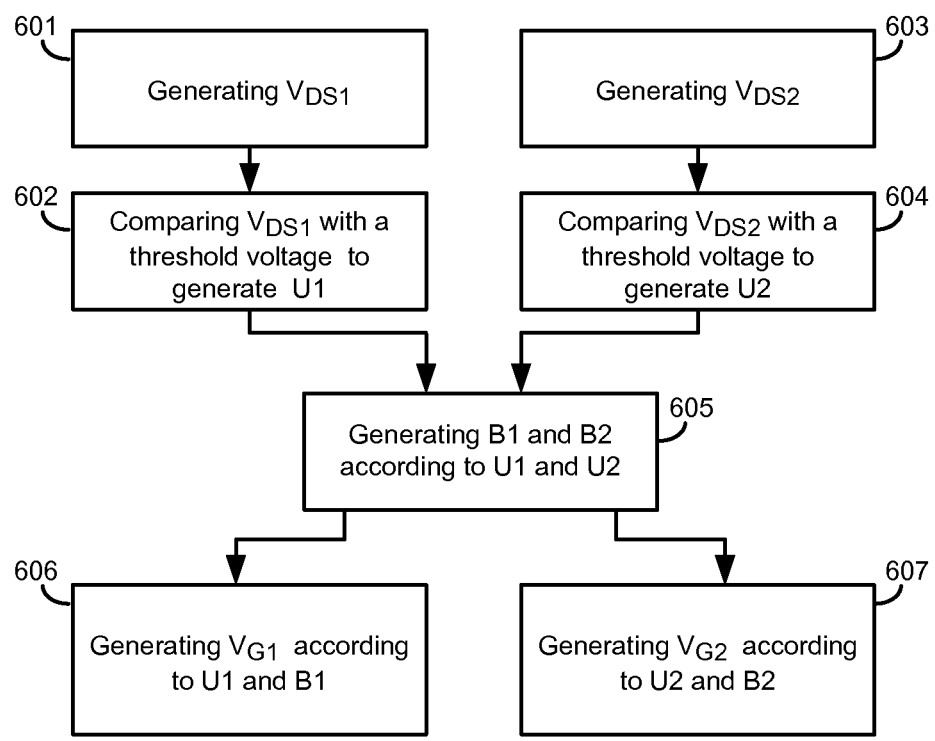
FIG. 6 illustrates a flow diagram illustrating a control method of a LLC resonant converter according to an alternative embodiment of the present invention.

FIG. 6 illustrates a flow diagram illustrating a control method for controlling a LLC resonant converter according to an alternative embodiment of the present invention. The control method may comprise steps 601-607.

In step 601, the voltage between the drain and the source of the first synchronous rectifier SR1 is sensed by a sensing circuit to generate a first drain-source voltage signal $V_{DS1}$.

In step 602, a first comparing circuit is configured to receive the first drain-source voltage signal $V_{DS1}$ to compare with a threshold voltage and to generate a first comparing signal U1.

In step 603, the voltage between the drain and the source of the second synchronous rectifier SR2 is sensed by a sensing circuit to generate a second drain-source voltage signal $V_{DS2}$.

In step 604, a second comparing circuit is configured to receive the second drain-source voltage signal $V_{DS2}$ to compare with a threshold voltage and to generate a second comparing signal U2.

In step 605, a first blanking signal B1 and a second blanking signal B2 are generated according to the first comparing signal U1 and the second comparing signal U2. In one embodiment, the first blanking signal B1 and the second blanking signal are logic complementary. The first blanking signal B1 is active beginning at each falling edge of the first comparing signal U1 and ending at each falling edge of the second comparing signal U2. The second blanking signal B2 is active beginning at each falling edge of the second comparing signal U2 and ending at each falling edge of the first comparing signal U1. The first blanking signal B1 is inactive when the second blanking signal B2 is active, and the first blanking signal B1 is active when the second blanking signal B2 is inactive. In one embodiment, the first blanking signal B1 and the second blanking signal B2 is logic high when both of them are active. The first synchronous rectifier SR1 remains off once the first blanking signal b1 is active. The second synchronous rectifier SR2 remains off once the second blanking signal B2 is active.

In step 606, the first blanking signal B1 and the first comparing signal U1 are configured to use for a logic operation to generate a first driving signal $V_{G1}$ driving the first synchronic diode SR1 on or off.

In step 607, the second blanking signal B2 and the second comparing signal U2 are configured to use for a logic operation to generate a second driving signal $V_{G2}$ driving the second synchronic diode SR2 on or off.

In step 602, the first comparing circuit is configured to receive the first drain-source voltage signal $V_{DS1}$ to compare with a threshold voltage and to generate a first comparing signal U1, wherein the threshold voltage may comprise a first threshold voltage $V_{TH1}$ and a second threshold voltage $V_{TH2}$, wherein the absolute value of the first threshold voltage $V_{TH1}$ is smaller than the absolute value of the second threshold voltage $V_{TH2}$. In one embodiment, the value of the first drain-source voltage signal $V_{DS1}$ and the second drain-source voltage signal $V_{DS2}$ are negative, thus we set $V^{TH2} < V_{TH1} < 0$ correspondingly. The first threshold voltage $V_{TH1}$ and the second threshold voltage $V_{TH2}$ are configured to compare with the first drain-source voltage signal $V_{DS1}$ respectively. When the first blanking signal B1 is inactive, the first synchronous rectifier SR1 is turned off once the first drain-source voltage signal $V_{DS1}$ is larger than the first threshold voltage $V_{TH1}$. When the first blanking signal B1 is inactive, the first synchronous rectifier SR1 is turned on once the first drain-source voltage signal $V_{DS1}$ is smaller than the second threshold voltage $V_{TH2}$.

In step 604, the second comparing circuit is configured to receive the second drain-source voltage signal $V_{DS2}$ to compare with a threshold voltage and to generate a second comparing signal U2, wherein the threshold voltage may comprise a first threshold voltage $V_{TH1}$ and a second threshold voltage $V_{TH2}$, wherein the absolute value of the first threshold voltage $V_{TH1}$ is smaller than the absolute value of the second threshold voltage $V_{TH2}$. In one embodiment, the value of the first drain-source voltage signal $V_{DS1}$ and the second drain-source voltage signal $V_{DS2}$ are negative, thus we set $V^{TH2} < V_{TH1} < 0$ correspondingly. The first threshold voltage $V_{TH1}$ and the second threshold voltage $V_{TH2}$ are configured to compare with the second drain-source voltage signal $V_{DS2}$ respectively. When the first blanking signal B1 is inactive, the first synchronous rectifier SR1 is turned off once the first drain-source voltage signal $V_{DS1}$ is larger than the first threshold voltage $V_{TH1}$. When the first blanking signal B1 is inactive, the first synchronous rectifier SR1 is turned on once the first drain-source voltage signal $V_{DS1}$ is smaller than the second threshold voltage $V_{TH2}$.

In the description of the control method of the present invention, the step 603 follows the step 601, the step 604 follows the step 602, and the step 607 follows the step 606. However, It should be known for an ordinary skill in the art that, the step 603 and the step 601 happen simultaneously, the step 604 and the step 602 happen simultaneously, and the step 607 and the step 606 happen simultaneously.

It should be noted that the ordinary skill in the art should know that the presented LLC resonant converter with two synchronous rectifiers in this invention not only limited in this topology, but also in other similar applications needed synchronous rectifiers. For example, push-pull type converter, full-bridge converter with synchronous rectifiers, and half-bridge converter with synchronous rectifiers etc.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

I claim:

1. A control circuit for a synchronous rectification circuit, wherein the synchronous rectification circuit has a first synchronous rectifier and a second synchronous rectifier, and wherein each of the first synchronous rectifier and the second synchronous rectifier has a drain, a source and a gate, the control circuit comprises:
a first comparing circuit having an input terminal and an output terminal, wherein the input terminal of the first comparing circuit is configured to receive a first drain-source voltage signal of the first synchronous rectifier, and wherein the first comparing circuit is configured to compare the first drain-source voltage signal with a threshold voltage and to provide a first comparing signal at the output terminal;
a second comparing circuit having an input terminal and an output terminal, wherein the input terminal of the second comparing circuit is configured to receive a second drain-source voltage signal of the second rectifier, and wherein the second comparing circuit is configured to compare the second drain-source voltage signal with the threshold voltage and to provide a second comparing signal at the output terminal;
a blanking circuit having a first input terminal, a second input terminal, a first output terminal and a second output terminal, wherein the first input terminal of the blanking circuit is coupled to the output terminal of the first comparing circuit for receiving the first comparing signal, and wherein the second input terminal of the blanking circuit is coupled to the output terminal of the second comparing circuit for receiving the second comparing signal, and wherein the blanking circuit is configured to conduct a logic operation to the first comparing signal and the second comparing signal so as to provide a first blanking signal and a second blanking signal respectively at the first output terminal and the second output terminal, and wherein the first blanking signal and the second blanking signal are logic complementary;
a first logic circuit having a first input terminal, a second input terminal, and an output terminal, wherein the first input terminal of the first logic circuit is coupled to the output terminal of the first comparing circuit for receiving the first comparing signal, and wherein the second input terminal of the first logic circuit is coupled to the first output terminal of the blanking circuit for receiving the first blanking signal, and wherein the first logic circuit is configured to conduct a logic operation to the first comparing signal and the first blanking signal so as to provide a first driving signal at the output terminal of the first logic circuit, and wherein the first driving signal is coupled to the gate of the first synchronous rectifier to control an on and off switching of the first synchronous rectifier; and
a second logic circuit having a first input terminal, a second input terminal, and an output terminal, wherein the first input terminal of the second logic circuit is coupled to the output terminal of the second comparing circuit for receiving the second comparing signal, and wherein the second input terminal of the second logic circuit is coupled to the second output terminal of the blanking circuit for receiving the second blanking signal, and wherein the second logic circuit is configured to conduct a logic operation to the second comparing signal and the second blanking signal so as to provide a second driving signal at the output terminal of the second logic circuit, and wherein the second driving signal is coupled to the gate of the second synchronous rectifier to control an on and off switching of the second synchronous rectifier.

2. The control circuit of claim 1, wherein:
the first blanking signal is active beginning at each falling edge of the first comparing signal and ending at each falling edge of the second comparing signal; and wherein:
the second blanking signal is active beginning at each falling edge of the second comparing signal and ending at each falling edge of the first comparing signal.

3. The control circuit of claim 2, wherein the threshold voltage comprises a first threshold voltage and a second threshold voltage; and wherein the first threshold voltage and the second threshold voltage are negative; and wherein the first threshold voltage is larger than the second threshold voltage; and wherein the first drain-source voltage signal is negative; and wherein:
when the first blanking signal is inactive, the first synchronous rectifier is turned off once the first drain-source voltage signal is larger than the first threshold voltage; and wherein
when the first blanking signal is inactive, the first synchronous rectifier is turned on once the first drain-source voltage signal is smaller than the second threshold voltage.

4. The control circuit of claim 2, wherein the threshold voltage comprises a first threshold voltage and a second threshold voltage; and wherein the first threshold voltage and the second threshold voltage are negative; and wherein the first threshold voltage is larger than the second threshold voltage; and wherein the second drain-source voltage signal is negative; and wherein:
when the second blanking signal is inactive, the second synchronous rectifier is turned off once the second drain-source voltage signal is larger than the first threshold voltage; and wherein
when the second blanking signal is inactive, the second synchronous rectifier is turned on once the second drain-source voltage signal is smaller than the second threshold voltage.

5. The control circuit of claim 2, wherein:
the first synchronous rectifier remains off when the first blanking signal is active; and wherein
the second synchronous rectifier remains off when the second blanking signal is active.

6. The control circuit of claim 1, wherein the blanking circuit further comprises:
a first inverter having an input terminal and an output terminal, wherein the input terminal of the first inverter is configured to receive the first comparing signal, and wherein the output terminal of the first inverter is configured to provide a first inverted signal of the first comparing signal;
a second inverter having an input terminal and an output terminal, wherein the input terminal of the second inverter is configured to receive the second comparing signal, and wherein the output terminal of the second inverter is configured to provide a second inverted signal of the second comparing signal; and
a trigger having a first input terminal, a second input terminal, a first output terminal and a second output terminal, wherein the first input terminal of the trigger is coupled to the output terminal of the first inverter, and wherein the second input terminal of the trigger is coupled to the output terminal of the second inverter, and wherein the first output terminal of the trigger is configured to provide the first blanking signal, and wherein the second output terminal of the trigger is configured to provide the second blanking signal, and wherein the first inverted signal of the first comparing signal is configured to set the first blanking signal, and wherein the second inverted signal of the second comparing signal is configured to reset the first blanking signal.

7. The control circuit of claim 1, wherein the first comparing circuit comprises a first hysteresis comparator.

8. The control circuit of claim 1, wherein the second comparing circuit comprises a second hysteresis comparator.

9. A LLC resonant converter comprising the control circuit of claim 1, wherein the LLC resonant converter further comprises:
  a bridge circuit having an input terminal and an output terminal, wherein the input terminal of the bridge circuit is coupled to an input terminal of the LLC resonant circuit to receive an input voltage signal;
  a LLC resonant circuit having an input terminal and an output terminal, wherein the input terminal of the LLC resonant circuit is coupled to the output terminal of the bridge circuit;
  a transformer having a primary winding, a first secondary winding and a second secondary winding, wherein the primary winding is coupled to the output terminal of the LLC resonant circuit; and
  the synchronous rectification circuit having the first synchronous rectifier and the second synchronous rectifier, wherein the first synchronous rectifier is coupled to an output terminal of the LLC resonant converter through the first secondary winding, and wherein the second synchronous rectifier is coupled to an output terminal of the LLC resonant converter through the second secondary winding.

10. A control method for a synchronous rectification circuit, wherein the synchronous rectification circuit has a first synchronous rectifier and a second synchronous rectifier, and wherein each of the first synchronous rectifier and the second synchronous rectifier has a drain, a source and a gate, and wherein the control method comprises:
  sensing a voltage between the drain and the source of the first synchronous rectifier to generate a first drain-source voltage signal and a voltage between the drain and the source of the second synchronous rectifier to generate a second drain-source voltage signal;
  comparing the first drain-source voltage signal with a threshold voltage to generate a first comparing signal;
  comparing the second drain-source voltage signal with the threshold voltage to generate a second comparing signal;
  conducting a logic operation to the first comparing signal and the second comparing signal to generate a first blanking signal and a second blanking signal, wherein the first blanking signal and the second blanking signal are logic complementary;
  operating the first blanking signal and the first comparing signal to generate a first driving signal, wherein the first driving signal is coupled to the gate of the first synchronous rectifier to control an on and off switching of the first synchronous rectifier; and
  operating the second blanking signal and the second comparing signal to generate a second driving signal, wherein the second driving signal is coupled to the gate of the second synchronous rectifier to control an on and off switching of the second synchronous rectifier; and wherein
  the first blanking signal is active beginning at each falling edge of the first comparing signal and ending at each falling edge of the second comparing signal; and wherein
  the second blanking signal is active beginning at each falling edge of the second comparing signal and ending at each falling edge of the first comparing signal.

11. The control method of claim 10, wherein generating the first comparing signal further comprises:
  comparing the first drain-source voltage signal with a first threshold voltage, wherein the first drain-source voltage signal and the first threshold voltage are negative;
  comparing the first drain-source voltage signal with a second threshold voltage, wherein the second threshold voltage is negative, and wherein the first threshold voltage is larger than the second threshold voltage; and wherein
  when the first blanking signal is inactive, turning the first synchronous rectifier off once the first drain-source voltage signal is larger than the first threshold voltage; and wherein
  when the first blanking signal is inactive, turning the first synchronous rectifier on once the first drain-source voltage signal is smaller than the second threshold voltage.

12. The control method of claim 10, wherein generating a second comparing signal further comprise:
  comparing the second drain-source voltage signal with a first threshold voltage, wherein the second drain-source voltage signal and the first threshold voltage are negative;
  comparing the second drain-source voltage signal with a second threshold voltage, wherein the second threshold voltage is negative, and wherein the first threshold voltage is larger than the second threshold voltage; and wherein
  when the second blanking signal is inactive, turning the second synchronous rectifier off once the second drain-source voltage signal is larger than the first threshold voltage; and wherein
  when the second blanking signal is inactive, turning the second synchronous rectifier on once the second drain-source voltage signal is smaller than the second threshold voltage.

13. The control method of claim 10, wherein:
  the first synchronous rectifier remains off when the first blanking signal is active; and wherein
  the second synchronous rectifier remains off when the second blanking signal is active.

14. A control method for a synchronous rectification circuit, wherein the synchronous rectification circuit has a first synchronous rectifier and a second synchronous rectifier, and wherein each of the first synchronous rectifier and the second synchronous rectifier has a drain, a source and a gate, and wherein the control method comprises:
  sensing a voltage between the drain and the source of the first synchronous rectifier to generate a first drain-source voltage signal, and a voltage between the drain and the source of the second synchronous rectifier to generate a second drain-source voltage signal;
  comparing the first drain-source voltage signal with a first threshold voltage and determining whether the first drain-source voltage signal is larger than the first threshold voltage, wherein the first drain-source voltage signal and the first threshold voltage are negative;

comparing the second drain-source voltage signal with the first threshold voltage and determining whether the second drain-source voltage signal is larger than the first threshold voltage, wherein the second drain-source voltage signal is negative;

turning off the first synchronous rectifier if the first drain-source voltage signal is larger than the first threshold voltage;

turning off the second synchronous rectifier if the second drain-source voltage signal is larger than the first threshold voltage;

generating a first blanking signal and a second blanking signal, if the first drain-source voltage signal is larger than the first threshold voltage, making the first blanking signal active and the second blanking signal inactive, if the second drain-source voltage signal is larger than the first threshold voltage, making the first blanking signal inactive and the second blanking signal active;

comparing the first drain-source voltage signal with a second threshold voltage and determining whether the first drain-source voltage signal is smaller than the second threshold voltage, wherein the second threshold voltage is smaller than the first threshold voltage;

comparing the second drain-source voltage signal with the second threshold voltage and determining whether the second drain-source voltage signal is smaller than the second threshold voltage;

turning on the first synchronous rectifier if the first drain-source voltage signal is smaller than the second threshold voltage and the first blanking signal is inactive and the second blanking signal is active; and turning on the second synchronous rectifier if the second drain-source voltage signal is smaller than the second threshold voltage and the first blanking signal is active and the second blanking signal is inactive.

15. The control method of claim 14, wherein the first blanking signal and the second blanking signal are logic complementary.

16. The control method of claim 14, wherein:

the first synchronous rectifier remains off when the first blanking signal is active; and wherein the second synchronous rectifier remains off when the second blanking signal is active.

\* \* \* \* \*